(12) United States Patent
Yu et al.

(10) Patent No.: US 9,672,559 B2
(45) Date of Patent: Jun. 6, 2017

(54) METHODS AND SYSTEMS FOR A DIGITAL INTERFACE FOR DISPLAYING RETAIL SEARCH RESULTS

(75) Inventors: James Yu, Glenview, IL (US); Geoffrey A. Colbath, Salt Lake City, UT (US); Kaunish Patel, Bartlett, IL (US); Brian J. Jordan, Jr., Hoffman Estates, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 678 days.

(21) Appl. No.: 13/523,050

(22) Filed: Jun. 14, 2012

(65) Prior Publication Data
US 2013/0339190 A1    Dec. 19, 2013

(51) Int. Cl.
*G06Q 30/06* (2012.01)
*G06Q 30/08* (2012.01)

(52) U.S. Cl.
CPC .............. *G06Q 30/0633* (2013.01)

(58) Field of Classification Search
CPC ................ G06Q 30/06; G06Q 30/08
USPC ................................ 705/26.1, 27.1
See application file for complete search history.

(56) References Cited

U.S. PATENT DOCUMENTS

| | | | |
|---|---|---|---|
| 5,749,081 A | 5/1998 | Whiteis | |
| 6,704,727 B1 | 3/2004 | Kravets | |
| 7,693,750 B2 | 4/2010 | Christensen | |
| 7,885,956 B2 * | 2/2011 | Danish et al. | 707/723 |
| 7,996,282 B1 * | 8/2011 | Scott | G06Q 30/06 705/27.1 |
| 2008/0097844 A1 * | 4/2008 | Hsu | G06Q 10/087 705/14.3 |
| 2011/0258067 A1 | 10/2011 | Rowell | |
| 2013/0106914 A1 * | 5/2013 | Jain | G06F 3/0482 345/666 |

OTHER PUBLICATIONS

PCT International Search Report and the Written Opinion of the International Searching Authority, in International application No. PCT/US13/43072, dated Sep. 27, 2013. (11 pages).
PCT, Notification Concerning Transmittal of International Preliminary Report on Patentability, in International application No. PCT/US2013/043072, dated Dec. 24, 2014 (6 pages).

* cited by examiner

*Primary Examiner* — James Zurita
(74) *Attorney, Agent, or Firm* — McAndrews, Held & Malloy, Ltd.

(57) ABSTRACT

A user interface for displaying retail search results is disclosed. The system and methods allow users to search for a plurality of retail items while simultaneously viewing a plurality of search results for each of the plurality of retail items. This interface allows users to easily compare the search results for each retail item, and to purchase a plurality of retail items simultaneously. In one example of the present disclosure, users may enter a plurality of retail items into a shopping list. The system may then display multiple results for each item on the shopping list in a carousel-like user interface, so users may view a plurality of results for a plurality of items simultaneously.

22 Claims, 11 Drawing Sheets

METHODS AND SYSTEMS FOR A DIGITAL INTERFACE FOR DISPLAYING RETAIL SEARCH RESULTS

FIELD OF THE DISCLOSURE

The present disclosure generally relates to methods and systems for a digital interface for displaying retail search results.

BACKGROUND

Technological advances and the proliferation of e-commerce have affected the user's retail experience. A growing number of customers are searching for, and purchasing items online. When searching for retail items online, results are preferably displayed in a simple yet comprehensive digital interface. Moreover, users often search for and purchase a plurality of items during a single shopping excursion.

Existing search engines often display search results on a digital interface, such as a list, a table, a matrix, a series of icons, a chart, etc. For example, U.S. Pat. No. 5,749,081 to Whiteis describes a system for presenting results in a table based on the system's recommendations and consumers' previous responses. U.S. Pat. No. 6,407,727 to Kravets describe a system that displays search results with associated links. While the prior searches generally work to provide the user with a comprehensive listing of relevant products, there is an identifiable need for a system that provides customers with a convenient way to get what they need whey they need it by expediting the time between an initial query and display of the truly relevant product(s)

DETAILED DESCRIPTION

The following description of example methods and apparatus is not intended to limit the scope of the description to the precise form or forms detailed herein. Instead, the following description is intended to be illustrative so that others may follow its teachings.

Example methods and systems for providing a digital interface for displaying retail search results of the present are disclosed herein. In general, the disclosed examples allow users to search for a plurality of retail items, while simultaneously viewing a plurality of search results for each of the plurality of retail items. This interface allows users to easily compare the search results for each retail item, and to purchase a plurality of retail items. This way, users may streamline their retail shopping experience, and their purchasing experience.

In one example of the present disclosure, users may enter a plurality of retail items into a shopping list. The system may then display multiple results for each item on the shopping list in a carousel-like digital interface, so users may view a plurality of results for a plurality of items simultaneously.

Figure 1:
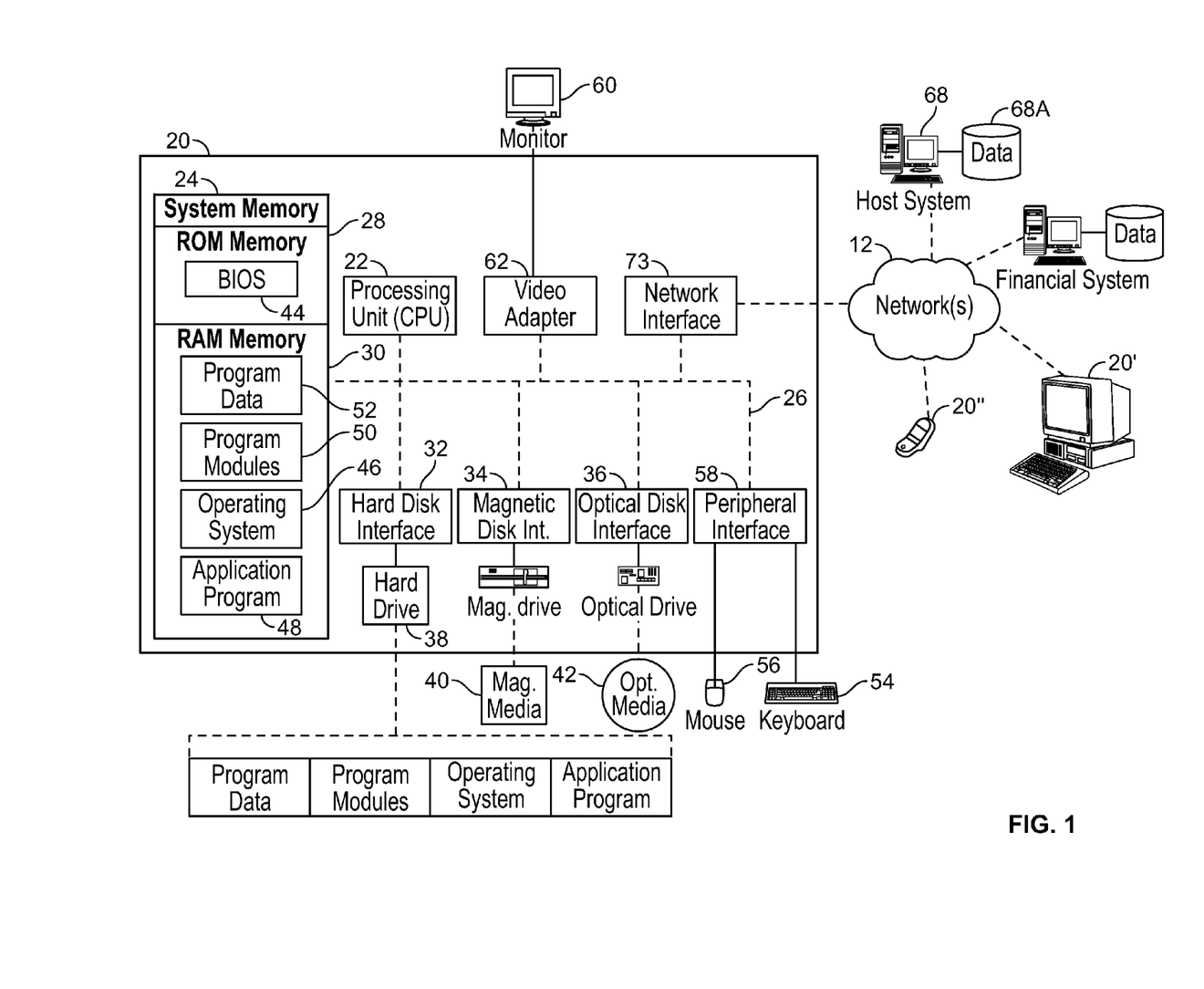
FIG. 1 illustrates, in block diagram form, components of an example computer network environment suitable for implementing the example household device management system.

With reference to the figures, the following disclose various example systems and methods for providing a digital interface for displaying retail search results. To this end, FIG. 1 illustrates a processing device 20, illustrated in the exemplary form of a mobile communication device, a processing device 20', illustrated in the exemplary form of a computer system, and a processing device 20" illustrated in schematic form, such as, for example, an appliance is provided with executable instructions to provide a means for a customer, e.g., a user, consumer, etc., to interact with the device 20 and/or to access a host system server 68. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, an appliance, a personal computer, mainframe computer, personal-digital assistant ("PDA"), cellular telephone, tablet, e-reader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local and/or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read-only memory (ROM) 28 and/or random-access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random-access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer-executable instructions comprising an operating system 46, one or more applications programs 48 (such as a Web browser), other program modules 50, and/or program data 52. Still further, computer-executable instructions may be downloaded to one or more of the computing devices as needed via a network connection, for example.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, motion sensor, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices not shown, such as, for example, speakers, cameras, printers, or another suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, executing a search for retail products within a product database, retrieving search results related to a search of a retail product, receiving information regarding retail product items such as product specification, price, and availability.

Communications between the processing device 20 and the host system server 68 may be exchanged via a further processing device, such as a network router (not shown) that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2A:
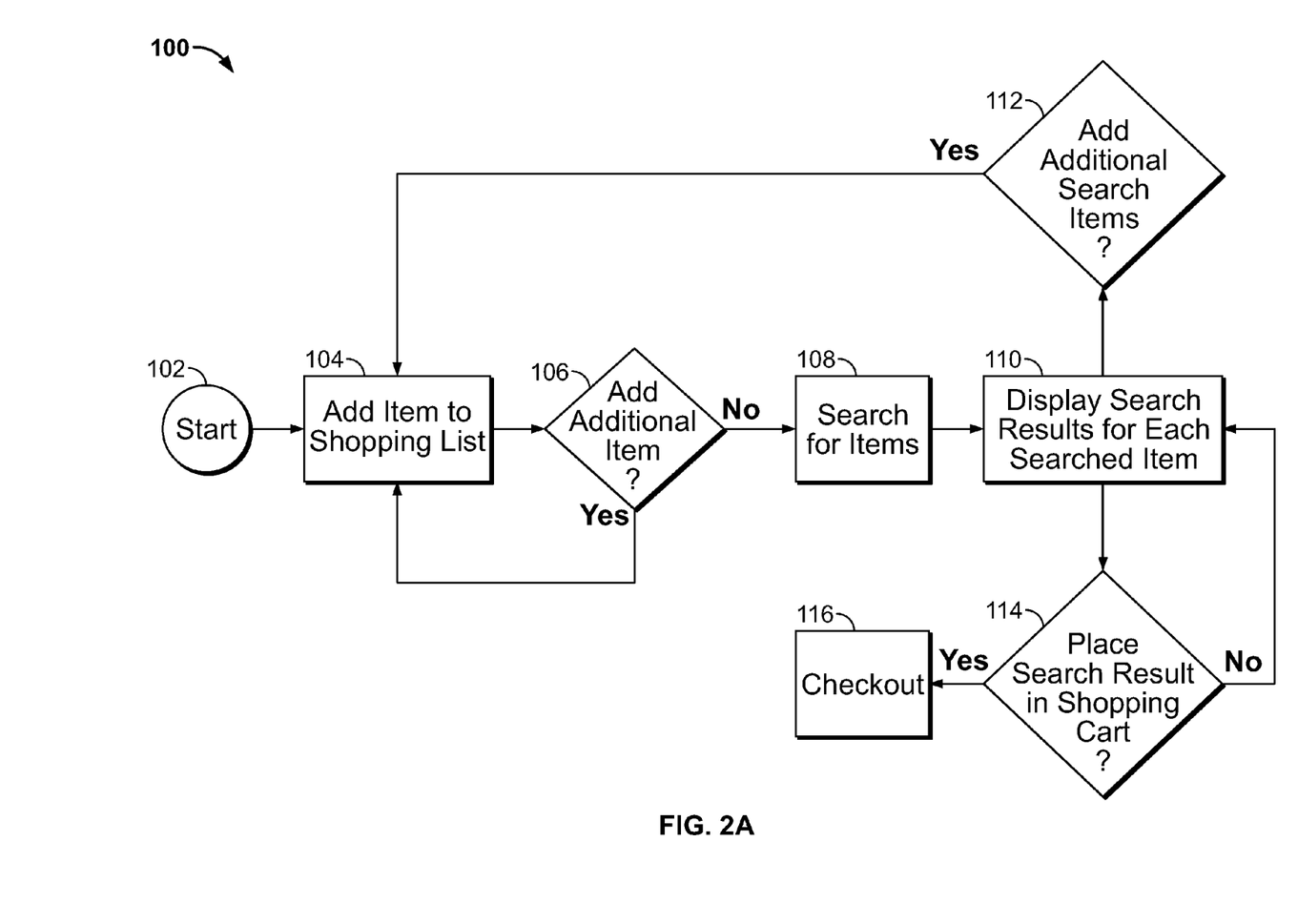
FIG. 2A illustrates, in block diagram form, a system for displaying retail search results of the present disclosure.

FIG. 2A illustrates, in block diagram form an example process 100 for implementation by a system constructed in accordance with the present disclosure. As shown in FIG. 2A, the process 100 begins the method of displaying retail search results at block 102. First, at block 104 the user adds at least one item to the shopping list. The shopping list may be represented as a list, and/or one or more icons displayed on a webpage, a list, and/or one or more icons displayed on a portion of a webpage, a list, and/or one or more icons displayed on a popout webpage, and or any other appropriate representation. At block 106 the user may add additional items to the shopping list, so that the shopping list comprises at least two items. As the user adds items to the shopping list in blocks 104 and 106, the process 100 may display predictive options based on the characters entered by the user, for example, the process 100 may display items that resemble the characters entered by the user, items that were recently entered into the process 100 by the user and/or other users; popular items in the process 100; popular items from a selected retailer; items that the user has recently searched for; items the user has recently viewed; items the user has previously purchased; items selected by the system; promotional items; and/or any other relevant items.

Next, in block 108, the system 100 searches for each item on the shopping list. The system 100 may search a data repository, a product database, a retail website, a series of retail websites, Internet listings, and/or any other relevant database. In one example of the present disclosure, the process 100 may limit the number of search results that it retrieves for each item on the shopping list, for example based on data restrictions.

Next, in block 110 the process 100 displays search results for each searched item from the shopping list. According to the present disclosure, the process 100 must display search results for at least two items, which were entered in the shopping list at block 104. In at least one example the process 100 may utilize the display 60 to show the search results for at least two retail items simultaneously, so that at least one search result for each of the two retail items is visible in one screen image. In one example of the present disclosure, the search results for each item on the shopping list is arranged horizontally, in a single row, such that the search results related to a first retail product is arranged above the search results related a second retail product. In this example, because of the horizontal layout, a user may view search results for the two retail products simultaneously, in one screen image. Further, in the example disclosed, a user may scroll horizontally to view additional search results for each visible retail product. Still further, in the instance where the number of search results exceeds the number of rows in the example horizontal arrangement, the user may scroll vertically to view the additional search results for addition retail products on the shopping list.

The disclosed process 100 allows users to add additional search items to the shopping list at block 112. For example, the process 100 may automatically refresh the displayed results after additional items are added at block 112. It is further understood that the process 100 may allow users to remove items from the shopping list while search results are displayed in block 110. For example, once a user removes an item from the shopping list, the displayed results in block 110 may automatically reflect that change by removing the search results associated with the removed product.

In block 114, the process 100 allows users to place displayed search results in a shopping cart for purchase. The example process 100 may allow a user to manually select search results displayed in block 110 to place in the shopping cart. For example, a user may hover over a search result to view product details and place the item in a cart. Block 114 may be automated so that the process 100 selects a search result corresponding to each item on the shopping list. The process 100 may select the search result based on lowest price, highest price, most popular, customer reviews, a user's previous purchase history, a user's pre-set preferences, and/or any other criteria. In block 116, the user proceeds to checkout to purchase the items in the shopping cart. Block 116 may additionally comprise one or more verification pages, in which the user has an opportunity to confirm the purchase. Block 116 may also comprise a payment process in which a user selects a payment method, and/or makes a payment.

Figure 2B:
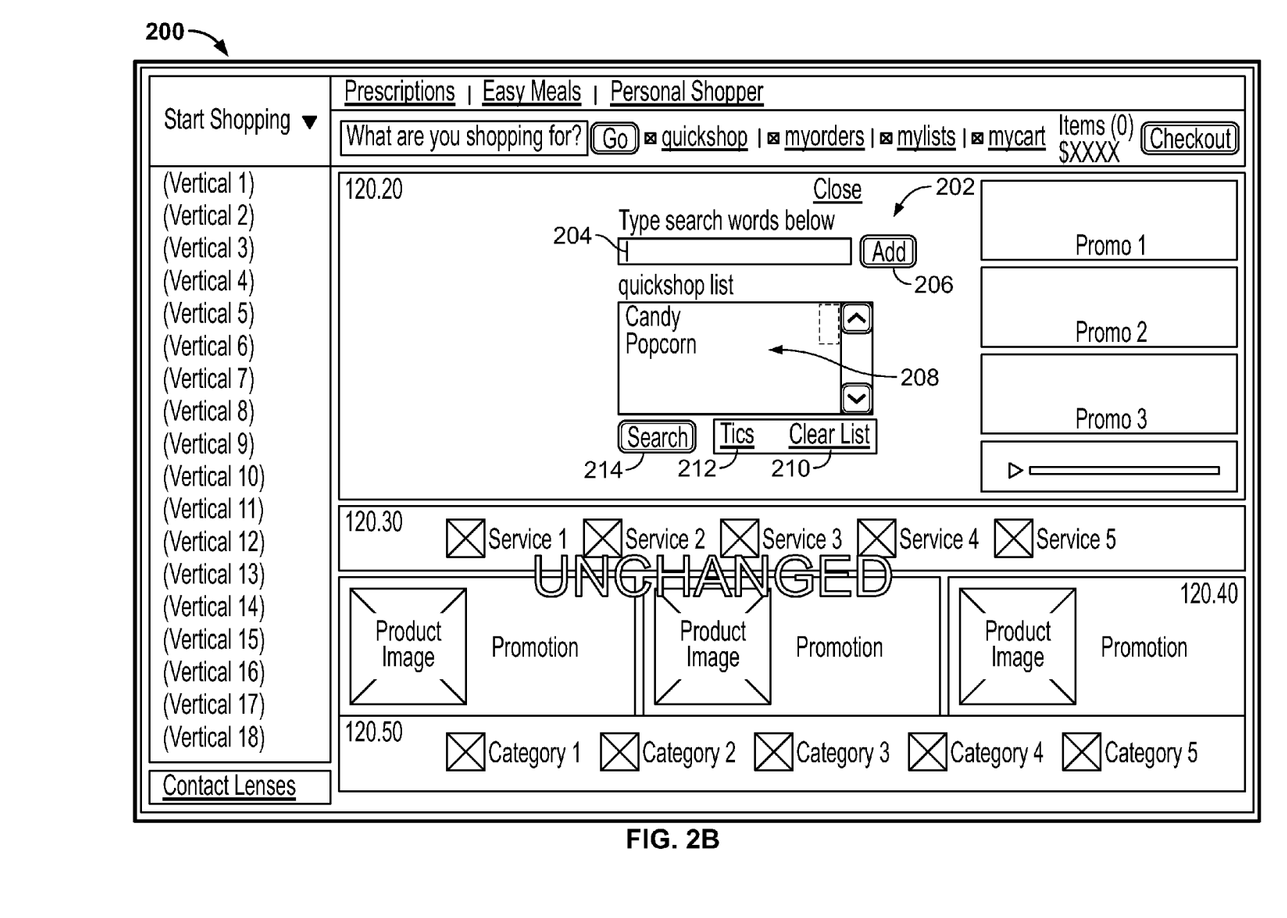
FIG. 2B is an example user interface for displaying retail search results of the present disclosure.

FIG. 2B illustrates an example user interface 200 for displaying retail search results on the example display 60 in accordance with one example of the present disclosure. In this example the user interface 200 is an online retail shopping environment comprising a search box 202 comprising a text entry box 204, an add button 206, a shopping list 208, a clear list button 210, a tips button 212 and a search button 214. In this example, a user may input text into the text entry box 204, and select the add button 206 to add the text entered into the text entry box 204 to the shopping list 208. Upon selecting the search button 214, the user interface 200 causes the server 68 to return retail search results associated with the items listed in the shopping list 208. A user may select the clear list button 210 to remove all items that are present on the shopping list 208. A user may select the tips button 212 and the process 100 may display additional information related to the features of the digital interface for displaying retail search results.

The user interface 200 may also comprise elements that are typically found in a digital retail shopping environment such as advertisements, links to retail departments, links to a digital shopping cart, and a checkout button. In this example, the user interface 200 may be implemented through a computer program, mobile app, website, database, or any other appropriate electronic format. The search results 110 may be displayed on an electronic device, such as, for example, a personal computer, a mobile device, a cellular phone, a personal digital assistant (PDA), a retail kiosk, and/or a physical medium using, such as, for example, the Internet, an internal network, or a social network.

Figure 3A:
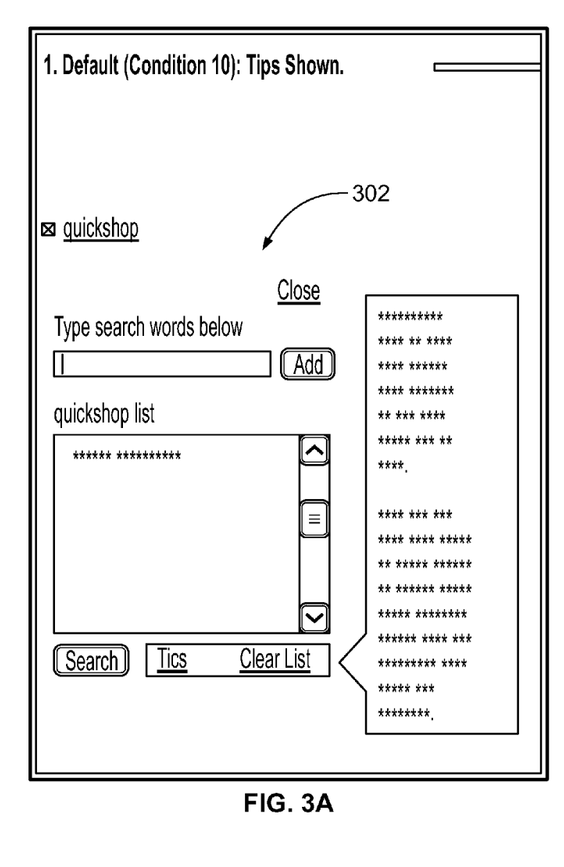
FIGS. 3A-3I are system diagrams depicting user interfaces for displaying retail search results.
Figure 3B:
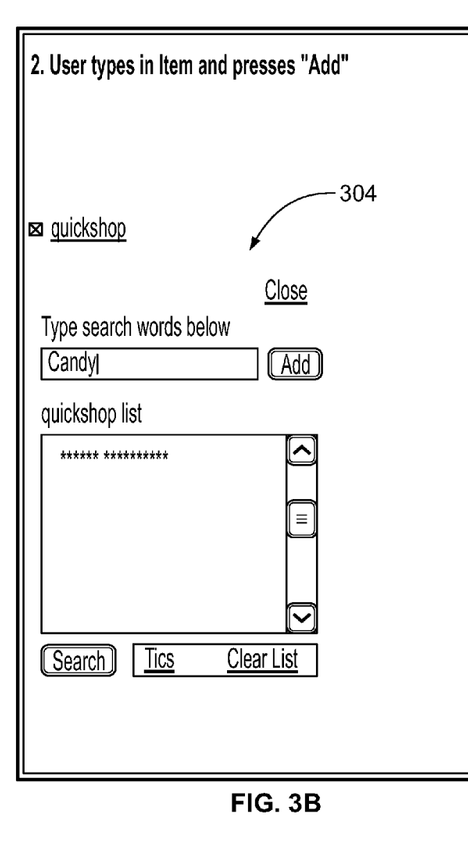
Figure 3C:
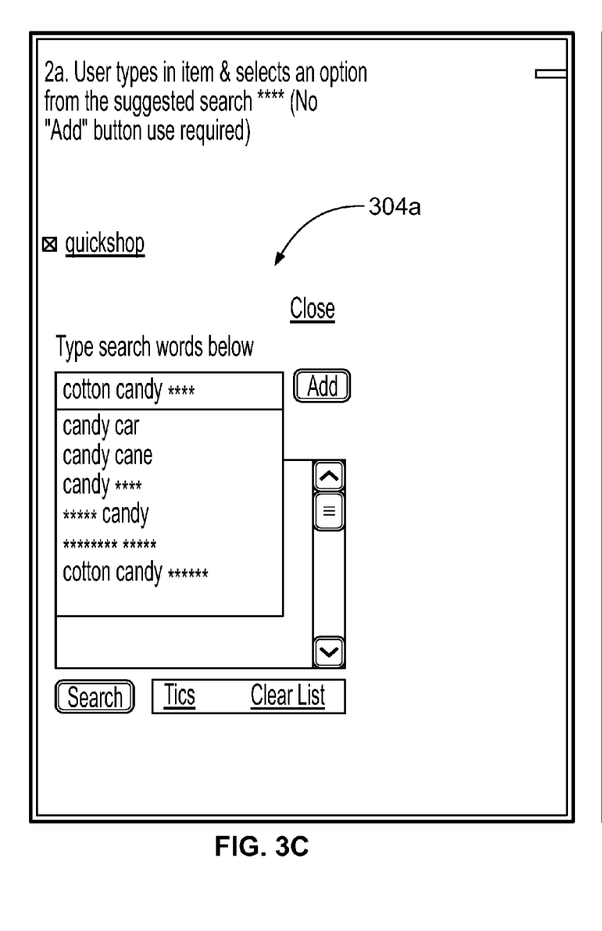
Figure 3D:
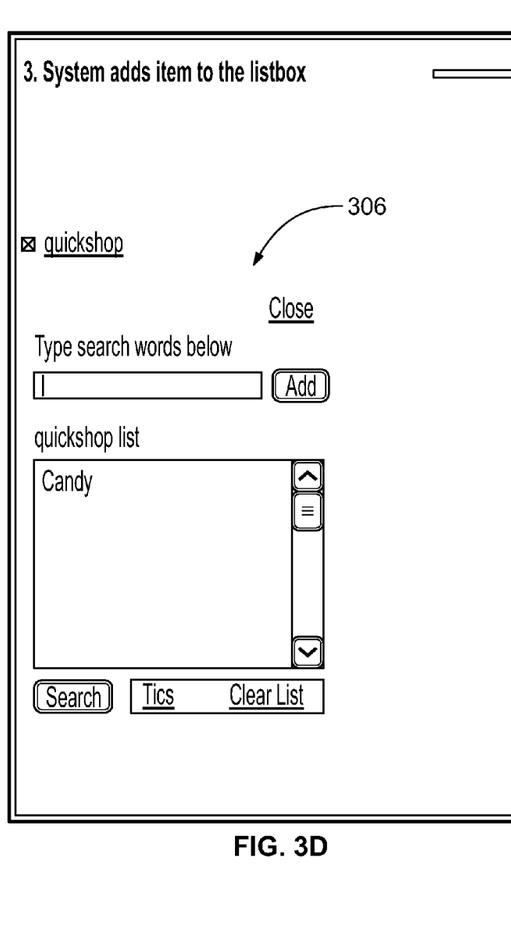
Figure 3E:
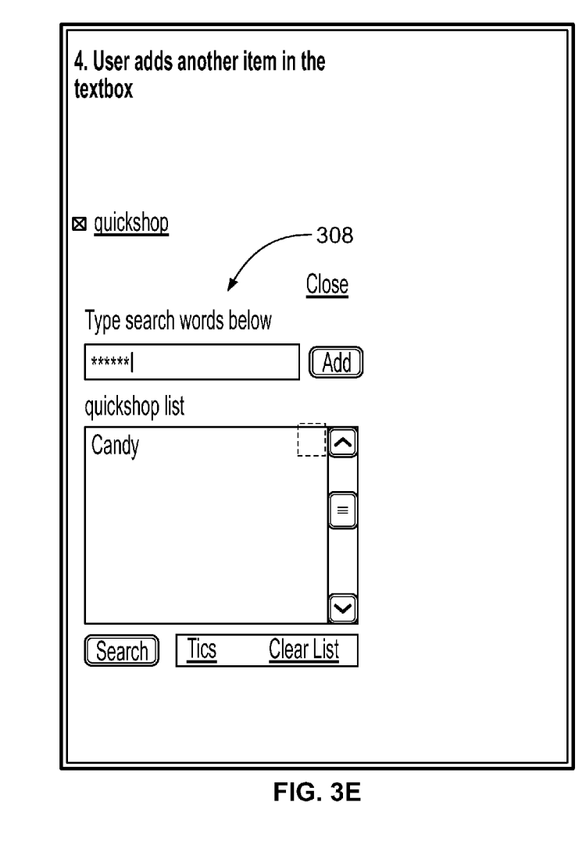
Figure 3F:
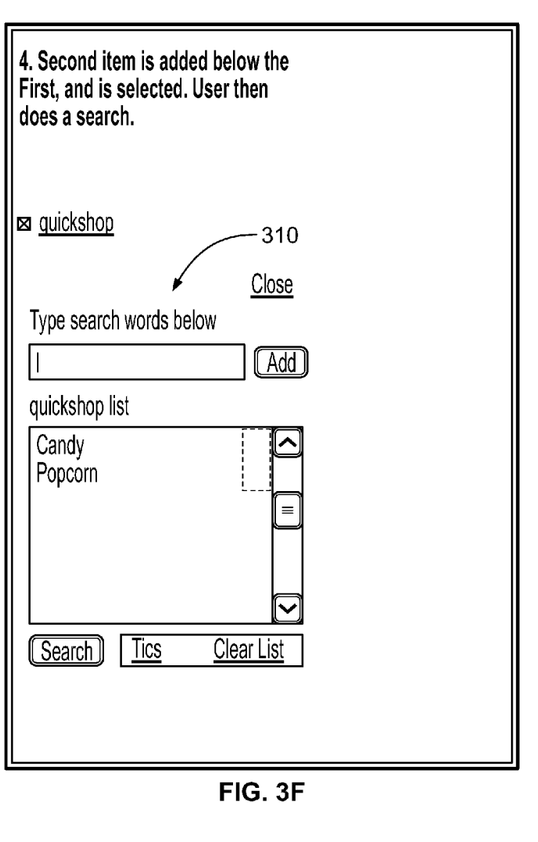
Figure 3G:
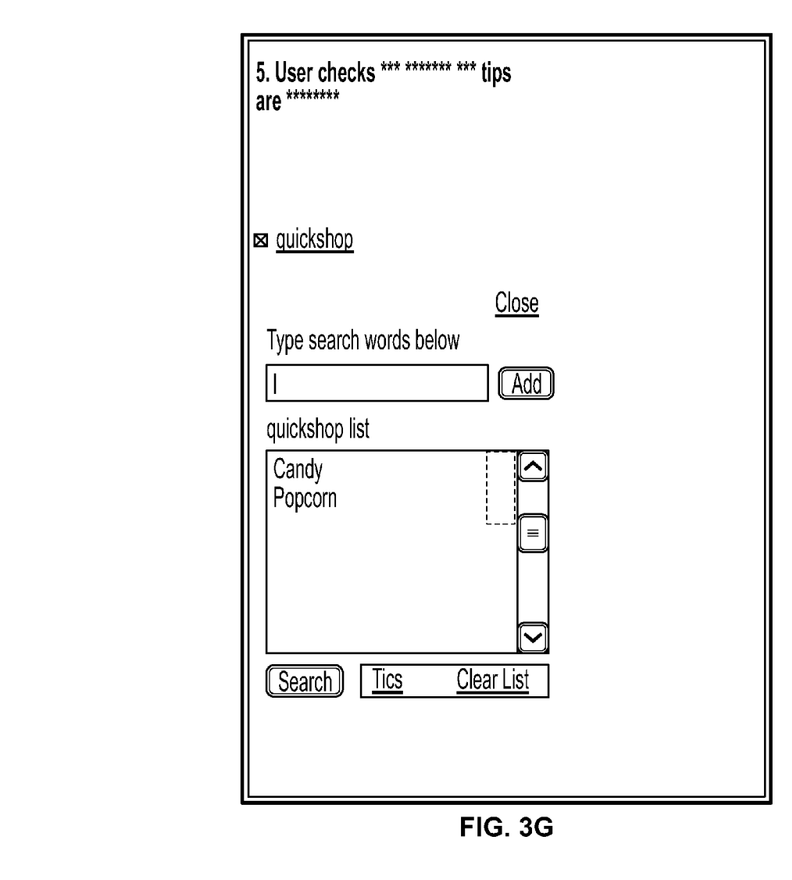
Figure 3H:
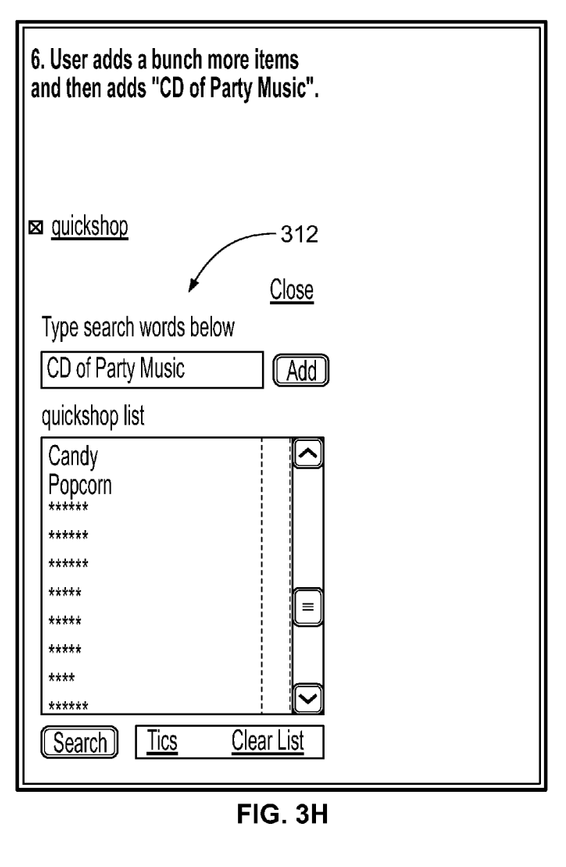
Figure 3I:
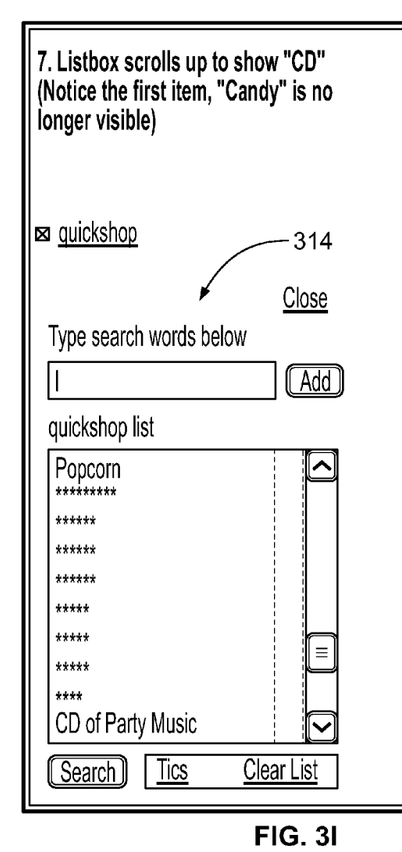

The example user interface diagrams of FIGS. 3A-3I depicts how retail items are added to a shopping list 208 in one example of the present disclosure. In FIG. 3A, block 302 shows a blank shopping list 208 before any items are added. As shown in FIG. 3B, block 304 a user may input the description of a first item into the text entry box 204. As shown in FIG. 3C, block 304a the text entry box may display various options related to the first item entered by the user in block 304. For example, the text entry box may display options that resemble the first item entered by the user, items that were recently entered into the process 100 by the user and/or other users; popular items in the process 100; items that the user has recently searched for; items the user has recently viewed; items the user has previously purchased; items selected by the process 100; promotional items; and/or any other relevant items. The user may select a displayed option to add that item to the shopping list 208. As shown in FIG. 3D, in block 306, the user may select the add button 206 to add the first item inputted in text box 204 to the shopping list 208. As shown in FIG. 3E, in block 308, the user may input a second item in the text box 204, and as shown in FIG. 3F, in block 310, the user may select the add button 206 to add the second item into the shopping list 208. As shown in FIG. 3G, in block 312 the user may input a plurality of items into the shopping list 208. As shown in FIGS. 3H and 3I, in blocks 312 and 314 respectively, the user may scroll through the shopping list 208 to view all the items that are present on the shopping list 208.

Figure 4A:
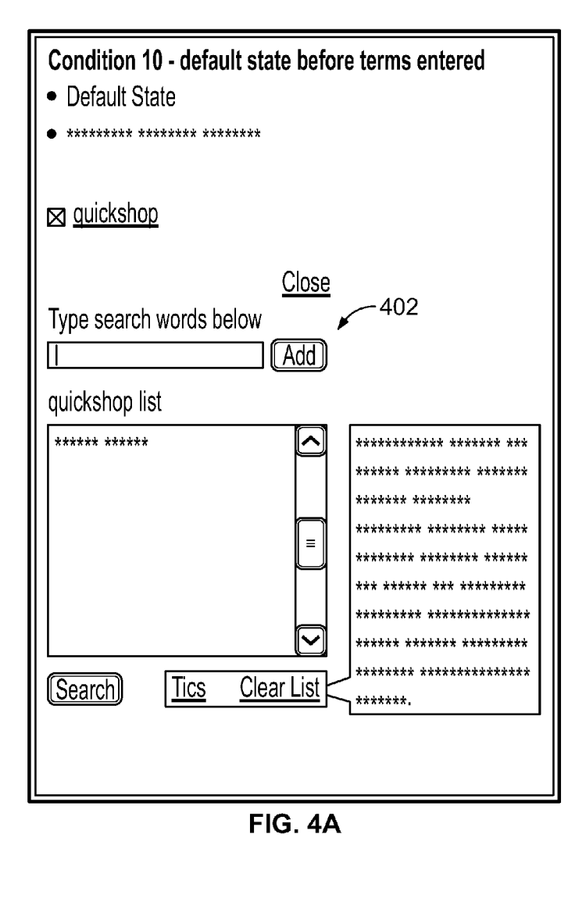
FIGS. 4A-D are system diagrams depicting user interfaces for displaying retail search results.
Figure 4B:
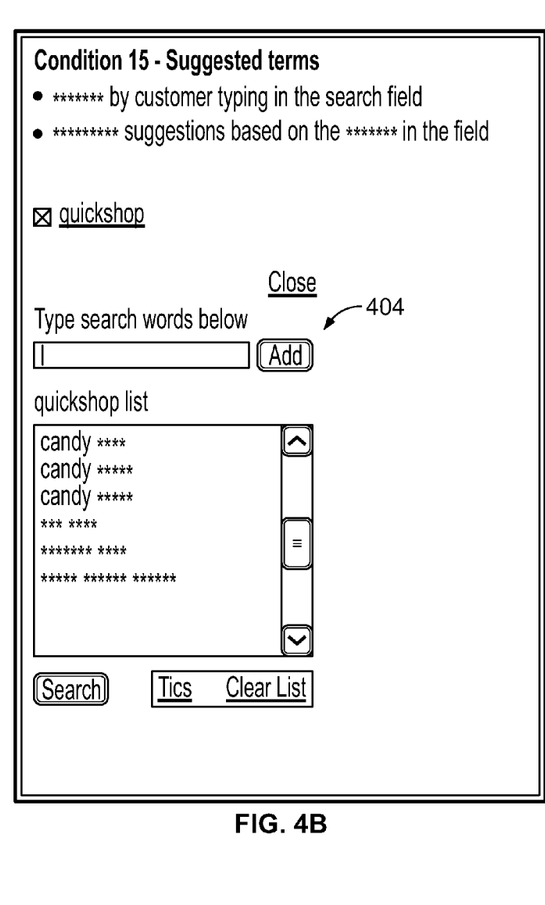
Figure 4C:
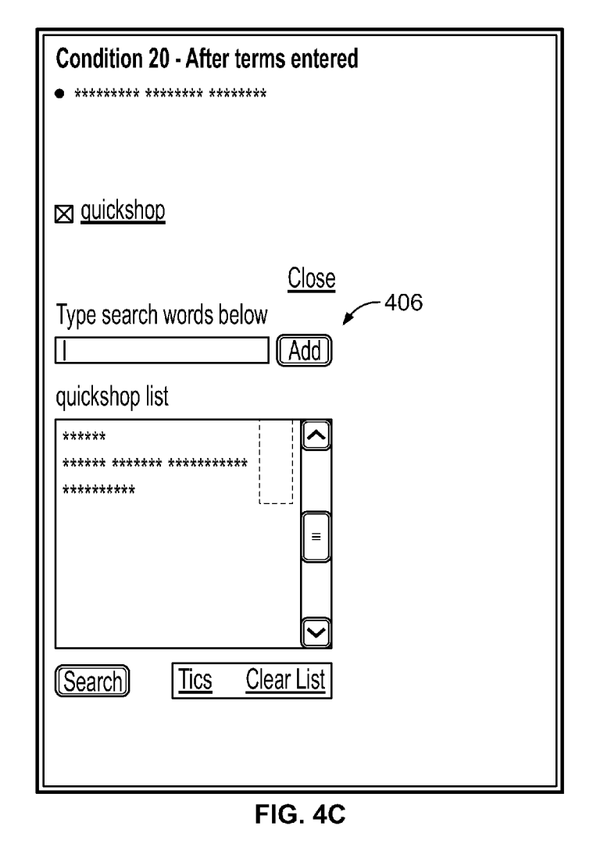
Figure 4D:
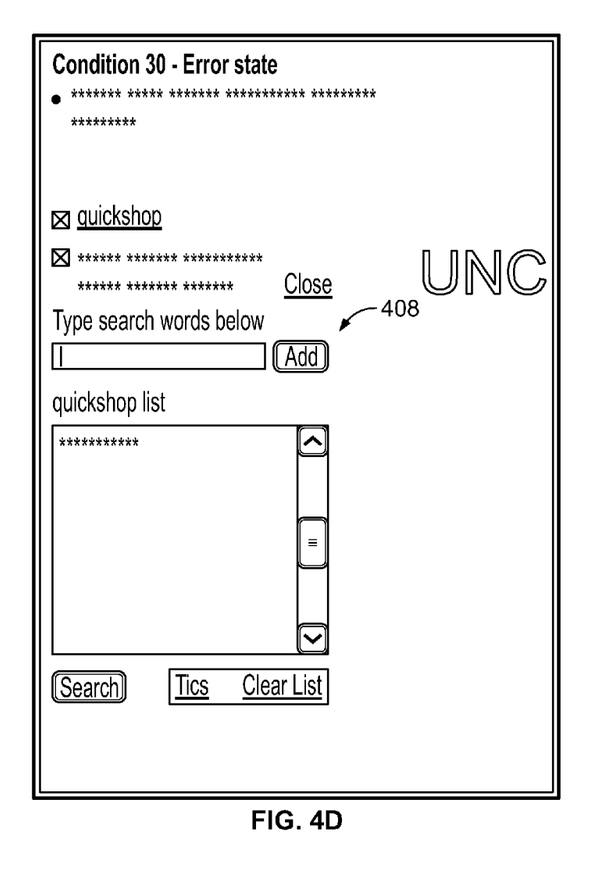

FIGS. 4A-D depict other sample system diagrams of the user interface of the present disclosure. In FIG. 4A, block 402 shows the shopping list 208 before any items are added to the shopping list 208. As shown in block 402, the process 100 may display instructions which direct the user to type in a search term and click the add button 206. As shown in FIG. 4B in block 404, the process 100 may display suggested terms to add to the shopping list 208. These suggested terms may be based on the text that is in the text box 204, based on the user's previous search history, based on the user's previous purchase history, based on the retailer's best-sellers, based on the retailer's promotional items, and/or any other appropriate basis. As shown in FIG. 4C, in block 406, the user may add a plurality of items to the shopping list 208. As shown in FIG. 4D in block 408, if the user selects the add button 206 while the text box 204 is empty, an error message appears, which directs the user to enter a search term first and then press the add button 206.

Figure 5:
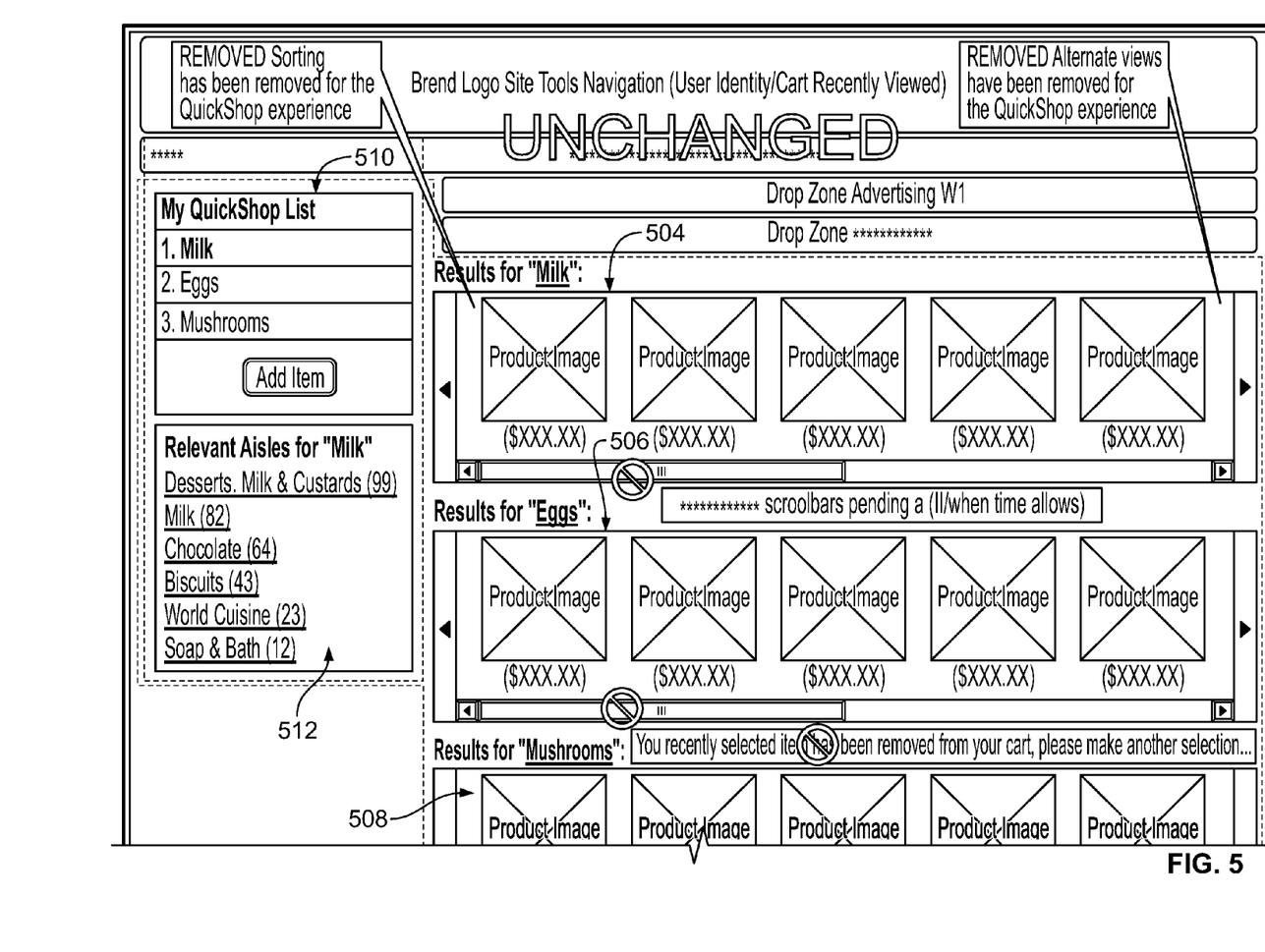
FIG. 5 is an example user interface for displaying retail search results of the present disclosure.

FIG. 5 depicts an user interface 502 for displaying retail search results of the present disclosure. The user interface 502 shows results for items listed in the shopping list 208. The results corresponding to each item on the shopping list 208 are displayed horizontally. For example, the results 504 are displayed in a horizontal row, and a user may scroll horizontally to view additional results. As shown in user interface 502, each search result displays a product image and a product price. Since the results are horizontal, the results for multiple items 504, 506 and 508 may be displayed simultaneously. This allows users to view search results for several different items at one time. As shown in the user interface 502, a user may view the search results relevant to every item on the shopping list in a single screen. In another aspect of the present disclosure, a user may scroll vertically down the screen to view search results related to additional items.

In one example of the disclosure, a user may hover over a product result displayed in the user interface 502 in order to add that item to their shopping cart and/or to view more information about the product displayed. Further, once a user places a product corresponding to an item which is on the shopping list 208 into the shopping cart, the shopping list 208 may reflect that change. For example, the process 100 may display a checkmark next to the item on the shopping list 208, the process 100 may cross out the item on the shopping list 208, the process 100 may remove the item on the shopping list 208, an image of the item on the shopping cart may appear next to the item on the shopping list 208 and/or any other appropriate response.

The user interface 502 also comprises a section 510 which displays the shopping list 208, a text box 204 and an add button 206 so that users may add additional items to their shopping list 208. The user interface 502 also comprises a section 512 which displays links to certain retail departments. It will be further understood that a user may remove items from the shopping list 208, and consequently the search results associated with the removed item may automatically disappear from the displayed user interface. In another example of the present disclosure, a user may add additional items to the shopping list 208, and search results associated with the additional item may automatically appear on the displayed user interface.

As would be understood by one of ordinary skill in the art, the process 100 may be associated with one or more recommendation engines, such that the search results identified by the process 100 are based on individual customer data gathered about a customer's behavior, previous transactions, and aggregate geographic, social, and economic demographics.

Additionally, as would be understood by one of ordinary skill in the art, at block 116, the checkout process may comprise an express checkout process, wherein the user purchases the items in a user's shopping cart using a pre-selected payment method, using a single click.

As would be appreciated by one of ordinary skill in the art, the disclosed process may be integrated with the system described in U.S. patent application Ser. No. 13/421,499, titled "Methods and Systems for Device Management with Sharing and Programming Capabilities." For example, a user may enter a food item into the text entry box 204, and the process 100 would provide search results related to the food item, and the device manager described in U.S. patent application Ser. No. 13/421,499 may also retrieve instructions related to food preparation instructions related to the food item. For instance, a user may enter "apple pie" into the text entry box 204. The process 100 of the present disclosure may retrieve retail search results related to "apple pie," such as flour, butter, eggs, apples, sugar, etc., while the device manager disclosed in U.S. patent application Ser. No. 13/421,499 also retrieves food preparation instructions for preparing an apple pie.

Also, one of ordinary skill in the art would appreciate that a user may enter a service into the text entry box 204, and the process 100 will return a list of products and/or services from the retailer related to the service inputted by the user. For example, a user may input a search term such as "dry cleaning," and the process 100 will return search results related to local dry cleaning services, dry cleaning services from third parties and/or retail partners, and dry cleaning products such as dry cleaning solution, dry cleaning bags, etc.

One of ordinary skill in the art will also appreciate that the checkout process at block 116 may be automated such that the product or service that the user searched for using the text entry box 116 is purchased automatically and scheduled, or delivered according to the user's pre-selected preferences.

While various concepts have been described in detail, it will be appreciated by those skilled in the art that various modifications and alternatives to those concepts could be developed in light of the overall teachings of the disclosure. For example, while various aspects of the invention have been described in the context of functional modules, it is to be understood that, unless otherwise stated to the contrary, one or more of the described functions and/or features may be integrated in a single physical device and/or a software module, or one or more functions and/or features may be implemented in separate physical devices or software modules. Further, while various aspects of the invention have been described in the context of a particular type of application (e.g., tablet, mobile, etc.), it is to be understood that, unless otherwise stated to the contrary, one or more of the described application functions, features, and/or aspects may be integrated into other application types. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person knowledgeable in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

We claim:

1. A method of displaying retail search results, comprising:
    inputting text into a search box for a first retail product;
    adding the first retail product to a shopping list displayed on a display;
    inputting text into the search box for a second retail product, wherein the first retail product and the second retail product are different kinds of retail products;
    adding the second retail product to the shopping list displayed on the display;
    providing a predictive option on the display based on the text input into the search box, wherein the predictive option can be added to the shopping list;
    communicating the shopping list to a host system;
    receiving from the host system at least two sets of search results related to the shopping list;
    concurrently displaying the shopping list and the at least two sets of search results in a scrollable configuration for the first retail product and the second retail product;
    selecting for purchase a first item from a first search result set by placing the first item in a shopping cart;
    automatically crossing out, checkmarking, or removing the first item in the shopping list in response to placing the first item in the shopping cart;
    selecting for purchase and a second item from a second search result set by placing the first item in the shopping cart; and
    automatically crossing out, checkmarking, or removing the second item in the shopping list in response to placing the second item in the shopping cart.

2. The method of claim 1 wherein a user creates the shopping list by typing the first retail product and the second retail product in the search box.

3. The method of claim 1 wherein a user creates the shopping list by entering the first retail product in the search box and selecting an add function.

4. The method of claim 1 wherein a user creates the shopping list by typing a plurality of retail items in the search box.

5. The method of claim 1 wherein the host system includes the database of a retail store.

6. The method of claim 1 wherein the at least two sets of search results each comprises at least one product image and at least one product price related to a corresponding retail item request.

7. The method of claim 1 comprising:
    removing the first retail product from the shopping list; and
    automatically causing a removal of the corresponding first search result set from a user interface.

8. The method of claim 1 wherein each of the at least two sets of search results are displayed in a horizontal scrollable configuration.

9. The method of claim 1 wherein, by sending the shopping list to concurrently receive multiple search result sets and by being able to concurrently review multiple search result sets based on the shopping list with multiple retail products listed, an online search process or an online shopping process is streamlined.

10. The method of claim 1 wherein the at least two sets of search results are displayed on a website, and wherein a user, via a graphical user interface, can hover over a particular product in the at least two sets of search results to view additional information about the particular product.

11. The method of claim 1 wherein the shopping list is displayed as a typed list entered by a user who is shopping using a mobile digital interface.

12. A computer-readable media having stored thereon computer executable instructions, wherein the instructions perform steps displaying a digital interface, comprising:
   inputting text into a search box for a first retail service;
   adding the first retail service to a shopping list displayed on a display;
   inputting text into the search box for a second retail service;
   adding the second retail service to the shopping list displayed on the display;
   providing a predictive option based on the inputted text, wherein the predictive option can be added to the shopping list;
   communicating the shopping list to a host system;
   receiving from the host system at least two sets of search results related to the shopping list;
   concurrently displaying the shopping list and the at least two sets of search results in a scrollable configuration for the first retail service and the second retail service;
   selecting for purchase a first item or service from a first search result set by placing the first item in a shopping cart;
   automatically crossing out, checkmarking, or removing the first item or service in the shopping list in response to placing the first item in the shopping cart;
   selecting for purchase a second item or service from a second search result set by placing the second item in the shopping cart; and
   automatically crossing out, checkmarking, or removing the second item or service in the shopping list in response to placing the second item or service in the shopping cart.

13. The computer-readable media of claim 12, further comprising creating the shopping list by typing the first retail service and the second retail service in the search box.

14. The computer-readable media of claim 12, wherein a user creates the shopping list by entering the first retail service in the search box and selecting an add function.

15. The computer-readable media of claim 12, wherein a user creates the shopping list by typing a plurality of retail services in the search box.

16. The computer-readable media of claim 12, wherein the host system includes the database of a retail store.

17. The computer-readable media of claim 12, wherein the at least two sets of search results each comprises at least one image and at least one price related to a corresponding retail item request.

18. The computer-readable media of claim 12, comprising:
   removing the first retail service from the shopping list; and
   automatically causing a removal of a corresponding search result set from the user interface.

19. The computer-readable media of claim 12, wherein each of the at least two sets of search results are displayed in a horizontal scrollable configuration.

20. The computer-readable media of claim 12, wherein the at least two sets of search results are displayed in a digital interface.

21. The computer-readable media of claim 12, wherein the at least two sets of search results are displayed on a website, and wherein a user, via the graphical user interface, can hover over a particular retail service in the at least two sets of search results to view additional information about the particular retail service.

22. The computer-readable media of claim 12, wherein the shopping list is displayed as a typed list entered by a user who is shopping using a mobile digital interface.

* * * * *